Oct. 15, 1940.  A. RONNING  2,217,816
STEERABLE VEHICLE TRUCK
Filed Dec. 26, 1939
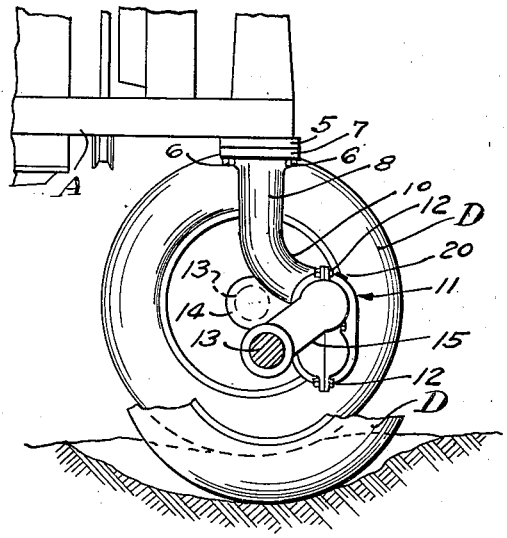
Fig-1-
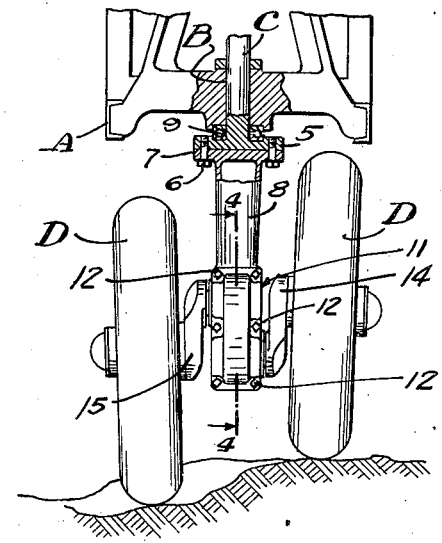
Fig-2-
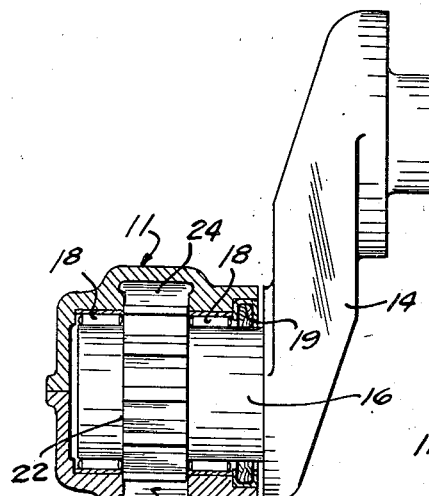
Fig-3-
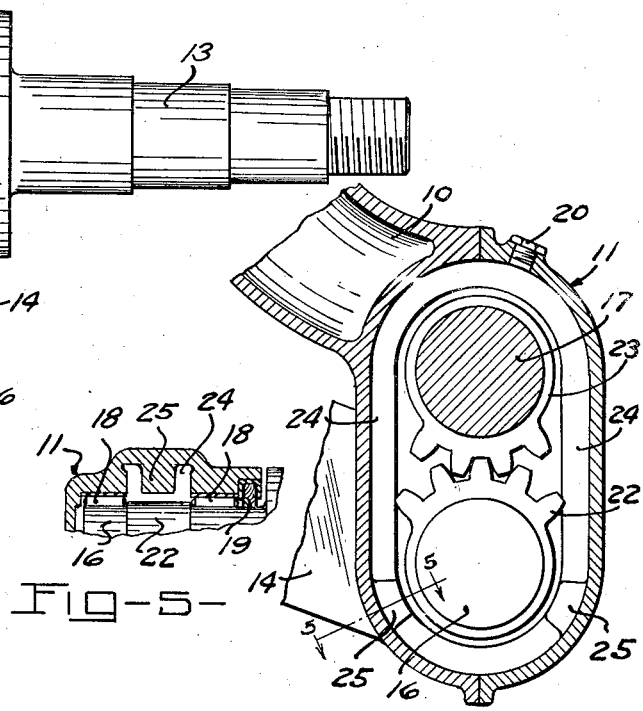
Fig-5-
Fig-4-
INVENTOR
ADOLPH RONNING
BY Carlsen & Hazle
ATTORNEYS Patented Oct. 15, 1940

2,217,816

UNITED STATES PATENT OFFICE 2,217,816

STEERABLE VEHICLE TRUCK

Adolph Ronning, Minneapolis, Minn.

Application December 26, 1939, Serial No. 310,941

17 Claims. (Cl. 280—87)

This invention relates to improvements in steerable supporting units or trucks for wheeled vehicles, particularly of the automotive type, and the primary object is to provide novel, efficient, and practical means for mounting a pair of closely spaced wheels so that they may be steered about a central vertical axis but so that they will have freedom for relative and interdependent up and down motion to thereby equally distribute load stresses between the wheels and facilitate steering action over rough or uneven ground surfaces. Such differential action of the wheels furthermore reduces the amount of up and down movement imparted to the vehicle as the wheels meet irregularities in the ground surface over which they travel.

This application is companion to several of my copending applications, and for a disclosure of other forms of functionally similar mechanisms attention is invited to my other applications Serial No. 219,369, filed July 15, 1938; Serial No. 242,725 and Serial No. 242,726, filed November 28, 1938, now Patents Nos. 2,208,599 and 2,208,600 of July 23, 1940; Serial No. 244,019, filed December 5, 1938, now Patent No. 2,208,601 of July 23, 1940; Serial No. 247,608, filed December 24, 1938, now Patent No. 2,209,093 of July 23, 1940; and Serial No. 250,344 and Serial No. 250,345, filed January 11, 1939, now Patents Nos. 2,209,094 and 2,209,095 of July 23, 1940.

In the drawing:

Fig. 1 is a side elevation of a lower forward portion of a tractor equipped with my invention for mounting the front wheels, said wheels being shown as running over uneven ground, and the near wheel being in greater part broken away to better disclose the structure.

Fig. 2 is a front end elevation of the structure shown in Fig. 1, an upper portion being shown in vertical cross section.

Fig. 3 is an enlarged horizontal section through the housing and showing one wheel mounting crank of my invention.

Fig. 4 is an enlarged vertical, longitudinal section along the line 4—4 in Fig. 2, only a part of one crank and the housing support being shown.

Fig. 5 is a fragmentary cross section taken along the line 5—5 in Fig 4.

Referring to the drawing more particularly, and by reference characters, A represents the frame of a tractor in the front end of which is formed a vertically axised bearing B for the reception and support of a journaled steering post C. At the rear the tractor is provided with the usual spaced traction wheels (not shown) which give the necessary lateral stability. The steering post C is oscillated about its vertical axis by the usual steering mechanism, which is not here shown but is described in certain of my copending applications hereinbefore identified, and the front ground wheels D are mounted to this post to be angled thereby for steering purposes. These wheels D are closely spaced since they are not designed to give lateral stability and also because they are intended to travel between crop rows when the tractor is used for row crop work.

The lower end of the steering post C is flanged at 5 beneath the bearing B for the attachment, as by screws 6, of the upper flanged end 7 of an upright, steerable, mounting member 8, said flange 5 bearing upwardly against a thrust bearing 9 to support the frontal end of the tractor. The member 8, preferably hollow for lightness and strength, is turned forwardly at its lower end 10 and is integrally connected with a housing 11. Said housing 11 is vertically elongated and made up of two complementary sections rigidly secured together by bolts 12, the rear section being integral with the member 8 as clearly shown so that the housing will turn with this member and the steering post C as the steering mechanism is manipulated.

The wheels D are mounted on spindles 13 extending rigidly from the rear ends of crank members or arms 14 and 15 disposed on opposite sides of the housing 11 and provided at their forward ends with stub shafts 16 and 17, respectively, which extend in parallelism and vertically spaced relation into the housing. Said stub shafts enter the housing through lateral openings formed at the parting line between the respective housing sections and are journaled in spaced anti-friction bearings 18, the openings of which is shown in Fig. 3, being sealed around the shafts by oil seal rings 19 so that the interior of the housing may be filled with lubricating oil. A removable plug 20 is provided for this purpose. The spindles 13 are slightly sloped outwardly to give the desired camber to the wheels as indicated in Fig. 2, but it should be noted that any relative up and down movement of the wheels, about the axes of the shafts 16 and 17, will not disturb either this camber or the relative angle of the wheels with respect to the upright steering axis, nor will such movement produce any relatively transverse movement as between the wheels such as would result in undesirable frictional ground contact.

It should be noted that, although the member 8 extends forwardly at its lower end, thus disposing the housing 11 forwardly of the vertical axis the post C, the cranks 14 and 15 both extend rearwardly at their wheel supported ends whereby the wheels operate directly opposite the member 8 and in normal alignment, and in the transverse vertical plane of the steering axis. The wheels will thus steer without resistance greater than usual.

The inner ends of the stub shafts 16 and 17 carry gears or gear segments 22 and 23 respectively, which segments are rigidly affixed to the shafts and operate in meshing engagement within the housing 11. The gear segments are narrower than the interior width of the housing, and the inner walls of the housing, in line with the gears, are grooved out as shown at 24 to clear the teeth of the gears as they turn. The lower end portion of the housing has stops or stop lugs 25 located at opposite points in the groove 24 in position to be engaged by the teeth of the lower gear and so limit the movement of the gears in either direction.

It will be understood that as the weight of the tractor is imposed on the housing 11 it will be transmitted through the gears 22—23, the stub shafts 16—17 and cranks 14—15 to the wheels D, all of which parts will remain substantially stationary while traveling over a smooth surface. When uneven surface is encountered, as illustrated in Figs. 1 and 2, then the gears 22—23 will function to permit the wheels to assume relative vertical positions, either crank arms 14 and 15 moving upwardly while the other moves downwardly an equal amount, and in a differential manner. The applied weight will, however, be at all times evenly distributed to the wheels.

The relative vertical movements of the wheels are limited by engagement of the lower gear 22 with the stops 25, but in all normal usage these stops will not be reached and the movement is free of all shocks or jars.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A steerable vehicle supporting truck comprising a member mounted for oscillation about a generally upright axis, a pair of cranks respectively pivoted at relatively higher and lower levels in the member, and for movement therewith about said axis, ground wheels rotatably mounted on the cranks, and gear means differentially connecting the cranks and operative to cause opposite up and down movements thereof as the truck travels over an irregular surface.

2. A steerable vehicle supporting truck comprising a member mounted for steering movement about an upright axis, a pair of cranks disposed on opposite sides of the member and pivoted thereto on vertically spaced axes, ground wheels rotatably secured to the cranks, and means differentially connecting the pivoted ends of the cranks for translating an up movement of either ground wheel to an equal down movement of the other.

3. In a vehicle, a steerable truck supporting one end thereof and comprising a pair of wheel supported cranks mounted for vertical oscillating movements about transversely extending, vertically spaced centers, and for steering movements about a common axis the transverse plane of which is substantially coincident with a vertical plane through the axis of the wheels, and gear means differentially connecting the cranks causing them to oscillate in opposite vertical directions.

4. In a vehicle, a steerable truck supporting one end thereof and comprising a pair of wheel supported cranks mounted for vertical oscillating movements about transverse, vertically spaced centers, and for steering movements about a common substantially vertical axis, and means differentially connecting the cranks causing them to oscillate in opposite vertical directions.

5. A steerable vehicle truck comprising a member mounted for movements about an upright axis for steering purposes, a pair of cranks journaled at one end in the member for movement therewith about said axis, the said cranks being journaled in said member on transversely extended and vertically spaced axes for movements thereabout in substantially vertical planes, ground wheels rotatably secured to the cranks, and means differentially connecting the journaled ends of the cranks and operative to cause opposite up and down movements of the cranks and to cause the imposed vehicle weight to be transmitted and distributed equally to the wheels in any relative vertical positions thereof.

6. In a steering truck for vehicles, a mounting member movable about a generally vertical axis, wheel supported members secured to the mounting member, one at each side thereof, for oscillating movements about transversely extended axes disposed in vertically spaced planes, and gear means differentially connecting said wheels supported members.

7. In a steering truck for vehicles, a mounting member rotatable about a generally upright axis, a pair of wheel supported members connected to the mounting member at opposite sides thereof for oscillating movements about transverse axes spaced one above the other, and means differentially connecting the wheel supported members.

8. In a steering truck for vehicles, a mounting member movable about a substantially vertical axis, a pair of wheel supported crank arms carried at opposite sides of the mounting member and pivotally connected thereto upon vertically spaced and substantially parallel axes for oscillation in substantially vertical planes, and means differentially connecting the arms for translating vertical movement of either into corresponding movement of the other in an opposite direction.

9. In a truck for supporting a vehicle, a mounting member, a pair of wheel supported crank arms disposed at opposite sides of the member and pivotally connected thereto upon vertically spaced axes for oscillation thereabout in generally vertical planes at their wheel supported ends, and means differentially connecting the arms causing them to oscillate in opposite directions in their respective vertical planes.

10. In a truck for supporting a vehicle, a mounting member, a pair of wheel supported crank arms disposed at opposite sides of the member and having journaled connections therewith on respective axes whereby the cranks may move in transversely spaced planes parallel with the direction of travel, said axes disposed one higher than the other, whereby said arms may oscillate in vertical planes at their wheel supported ends, and gear means differentially connecting the arms.

11. A vehicle supporting device comprising a mounting member, a housing secured thereto, a pair of crank arms pivoted at one end in the housing on vertically spaced and parallel axes, ground wheels rotatably secured to the arms, and a gear train differentially connecting the arms.

12. A vehicle supporting device comprising a housing, a pair of wheel supported crank arms journaled to the housing on vertically spaced substantially horizontal axes, and meshing gear segments on the journaled ends of the arms connecting the arms for differential vertical swinging movements.

13. A vehicle supporting device comprising a mounting member, a housing thereon, a pair of wheel supported cranks journaled at their ends through opposite sides of the housing on vertically spaced, substantially horizontal axes for vertical swinging movements thereabout, gears on the journaled ends of the arms within the housing and meshing with each other for differentially connecting the arms, and means limiting the movements of the arms.

14. A vehicle supporting truck comprising a housing, a pair of crank arms journaled at one end through opposite sides of the housing at vertically spaced locations therein and for oscillating movements in substantially vertical planes, ground wheels supporting the arms and movable vertically therewith, gears located within the housing and secured to the respective journaled ends of the arms in meshing engagement for differentially connecting said arms, and stop means in the housing for engaging one gear and limiting oscillating movements of the arms.

15. A vehicle supporting device comprising a housing, a pair of crank arms journaled through opposite sides of the housing on vertically spaced and substantially horizontal axes for oscillating movements thereabout, ground wheels rotatably secured to the arms, segmentally toothed gears located in the housing and secured to the journals of the crank arms in meshing engagement to thereby differentially connect the said arms, and the said housing having inwardly opening grooves in the plane of the gears for clearing said toothed portions thereof.

16. A vehicle supporting device comprising a housing, a pair of crank arms journaled through opposite sides of the housing on spaced axes for oscillating movements thereabout, ground wheels rotatably secured to the arms, segmentally toothed gears located in the housing and secured to the journals of the crank arms in meshing engagement to thereby differentially connect the said arms, the said housing having inner grooves located in the plane of the gears for giving clearance to the toothed portions thereof, and stops located in said grooves for engaging the toothed portion of one gear and thereby limiting the differential movements of the crank arms.

17. A steerable vehicle truck comprising a mounting member mounted for oscillation about a generally vertical steering axis, the lower end of said member being turned forwardly, a pair of cranks journaled on said lower end of the member on vertically spaced and horizontally extending axes, the said cranks extending rearwardly for oscillating movements about said axes in substantially vertical planes, ground wheels rotatably secured to the rear ends of the cranks and movable therewith at opposite sides of the mounting member substantially in the same transverse plane as the steering axis, and means differentially connecting the said cranks causing them to oscillate in opposite directions.

ADOLPH RONNING.